US012612516B2

(12) United States Patent
Nishio et al.

(10) Patent No.: US 12,612,516 B2
(45) Date of Patent: Apr. 28, 2026

(54) CATIONIC CURING AGENT, METHOD FOR PRODUCING SAME AND CATIONICALLY CURABLE COMPOSITION

(71) Applicant: DEXERIALS CORPORATION, Tochigi (JP)

(72) Inventors: Takeshi Nishio, Tochigi (JP); Shunsuke Tsuda, Tochigi (JP); Kazunobu Kamiya, Tochigi (JP)

(73) Assignee: DEXERIALS CORPORATION, Tochigi (JP)

( * ) Notice: Subject to any disclaimer, the term of this patent is extended or adjusted under 35 U.S.C. 154(b) by 568 days.

(21) Appl. No.: 18/007,335

(22) PCT Filed: Feb. 2, 2022

(86) PCT No.: PCT/JP2022/003919

§ 371 (c)(1),
(2) Date: Jan. 30, 2023

(87) PCT Pub. No.: WO2022/176608

PCT Pub. Date: Aug. 25, 2022

(65) Prior Publication Data

US 2023/0279217 A1 Sep. 7, 2023

(30) Foreign Application Priority Data

Feb. 19, 2021 (JP) ................................ 2021-025418

(51) Int. Cl.
*C08L 63/00* (2006.01)
*C08G 59/06* (2006.01)
*C08G 59/24* (2006.01)
*C08G 59/70* (2006.01)

(52) U.S. Cl.
CPC .............. *C08L 63/00* (2013.01); *C08G 59/06* (2013.01); *C08G 59/24* (2013.01); *C08G 59/70* (2013.01)

(58) Field of Classification Search
CPC ......... C08L 63/00; C08G 59/06; C08G 59/24; C08G 59/70
USPC .......................................................... 523/204
See application file for complete search history.

(56) References Cited

U.S. PATENT DOCUMENTS

| | | | |
|---|---|---|---|
| 4,437,959 | A | 3/1984 | Hayase et al. |
| 2003/0032729 | A1 | 2/2003 | Takai et al. |
| 2007/0010636 | A1 | 1/2007 | Kamiya et al. |
| 2010/0331435 | A1 | 12/2010 | Kamiya |
| 2011/0196110 | A1 | 8/2011 | Kamiya |
| 2017/0253694 | A1 | 9/2017 | Kamiya |
| 2018/0371155 | A1 | 12/2018 | Kamiya |
| 2019/0194454 | A1 | 6/2019 | Nishio et al. |
| 2019/0203087 | A1 | 7/2019 | Kamiya |
| 2022/0098357 | A1 | 3/2022 | Kamiya |
| 2022/0298297 | A1 | 9/2022 | Nishio et al. |

FOREIGN PATENT DOCUMENTS

| | | |
|---|---|---|
| CN | 106661201 | 5/2017 |
| CN | 109942613 | 6/2019 |
| JP | S57-501730 | 9/1982 |
| JP | S58-021418 | 2/1983 |
| JP | S58-187423 | 11/1983 |
| JP | S58-187424 | 11/1983 |
| JP | 2001-172368 | 6/2001 |
| JP | 2008-031325 | 2/2008 |
| JP | 2009-203477 | 9/2009 |
| JP | 2009-221465 | 10/2009 |

(Continued)

OTHER PUBLICATIONS

International Search Report issued for related International Patent Application No. PCT/JP2020/031041 on Nov. 2, 2020.
Written Opinion issued for related International Patent Application No. PCT/JP2020/031041 on Nov. 2, 2020.

(Continued)

*Primary Examiner* — David T Karst
(74) *Attorney, Agent, or Firm* — IPUSA, PLLC

(57) ABSTRACT

Provided is a cationic curing agent including porous particles and a mixture carried on the porous particles. The mixture includes a compound represented by Formula (1) below in which $R^1$ to $R^3$ are identical and $R^1$ to $R^6$ are identical and a compound represented by Formula (1) below in which at least one of $R^1$ to $R^6$ is different.

Formula (1)

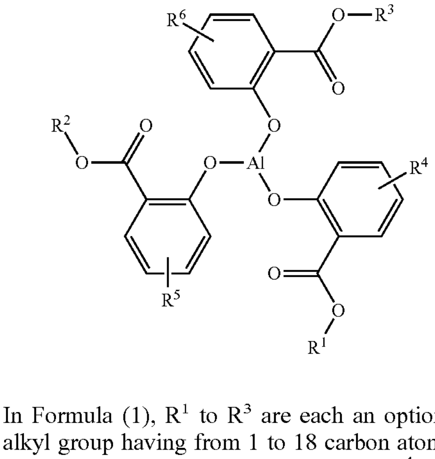

In Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent.

13 Claims, No Drawings

(56) References Cited

FOREIGN PATENT DOCUMENTS

| | | |
|---|---|---|
| JP | 2010-168449 | 8/2010 |
| JP | 2011-026443 | 2/2011 |
| JP | 2012-188596 | 10/2012 |
| JP | 2013-100382 | 5/2013 |
| JP | 2016-056274 | 4/2016 |
| JP | 2016-176009 | 10/2016 |
| JP | 2017-222781 | 12/2017 |
| JP | 2019-112321 | 7/2019 |
| WO | 82/001710 | 5/1982 |
| WO | 2016024471 | 2/2016 |
| WO | 2016/039193 | 3/2016 |
| WO | 2017/104244 | 6/2017 |
| WO | 2019/009262 | 1/2019 |
| WO | 2020/166398 | 8/2020 |
| WO | 2021/039480 | 3/2021 |

OTHER PUBLICATIONS

Chinese Office Action received for related Chinese Patent Application No. 202080058415.8 mailed on Jun. 28, 2024, with English translation.

Office Action received for related U.S. Appl. No. 17/636,499 mailed on Oct. 1, 2024.

International Search Report for PCT/JP2022/003919 mailed on Apr. 26, 2022.

Hayase, S. et al., "Polymerization of Cyclohexene Oxide with Aluminum Complex/Silanol Catalysts. V. A Catalytic Activity Dependence on the Aluminum Chelate Structure", Journal of Polymer Science, Polymer Chemistry Edition, 1982, vol. 20, No. 11, pp. 3155-3165, ISSN: 0360-6376.

CATIONIC CURING AGENT, METHOD FOR PRODUCING SAME AND CATIONICALLY CURABLE COMPOSITION

TECHNICAL FIELD

The present invention relates to a cationic curing agent, a method of producing the cationic curing agent, and a cationically curable composition.

BACKGROUND ART

As a method of cationic curing of an epoxy resin, a method by a catalyst using an aluminum chelate compound and a silanol compound in combination has been known. In this method, the aluminum chelate compound and the silanol compound are reacted with each other to generate cationic curing initiation species to develop cationic curing properties.

One example of a technique associated with a latent curing agent using the above-described curing system is a method of producing porous particles carrying an aluminum chelate compound. For example, proposed is a method of physically separating an aluminum compound and a silanol compound from each other, with the aluminum compound carried on porous particles that are produced using a polyfunctional isocyanate compound (see, for example, PTL 1).

As an example similar to the above-proposed technique, proposed is a method of enhancing curing properties by using a difunctional isocyanate compound in combination with a polyfunctional isocyanate compound (see, for example, PTL 2).

Moreover, proposed is a method of using a radical-polymerizable compound at the time porous particles are produced (see, for example, PTL 3).

Furthermore, proposed is a method of using porous inorganic particles as porous particles (see, for example, PTL 4).

As a method of further enhancing latent properties in the above-described methods, proposed is a method of treating surfaces of porous particles with a certain silane treatment agent (see, for example, PTL 5).

CITATION LIST

Patent Literature

PTL 1: Japanese Patent Application Laid-Open (JP-A) No. 2009-203477
PTL 2: JP-A No. 2012-188596
PTL 3: JP-A No. 2009-221465
PTL 4: JP-A No. 2013-100382
PTL 5: JP-A No. 2016-056274

SUMMARY OF INVENTION

Technical Problem

All of the above-proposed techniques are methods of making an aluminum chelate compound latent and are based on the premise that cationic curing properties are controlled by the state of porous particles to be used. There is however a problem that control of curing properties and control of latent properties by designing porous particles in various ways have a trade-off relationship in view of the principles on which those techniques are based.

The present invention aims to solve the above-described various problems existing in the art and to achieve the following object. Specifically, an object of the present invention is to provide: a cationic curing agent that has enhanced curing properties without degradation in latent properties; a method of producing the cationic curing agent; and a cationically curable composition including the cationic curing agent.

Solution to Problem

Means for solving the above problems are as follows.

<1> A cationic curing agent, including:

porous particles; and a mixture carried on the porous particles, the mixture including a compound represented by Formula (1) below:

Formula (1)

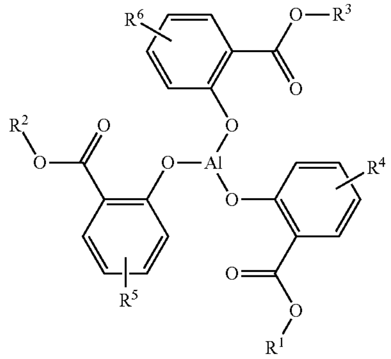

in which $R^1$ to $R^3$ are identical, and $R^4$ to $R^6$ are identical; and a compound represented by Formula (1) in which at least one of $R^1$ to $R^6$ is different, wherein in Formula (1), $R^1$ to $R^3$ are each an optionally branched alkyl group having from 1 to 18 carbon atoms, or a phenyl group that may have a substituent, and $R^1$ to $R^3$ are each a hydrogen atom, an optionally branched alkyl group having from 1 to 4 carbon atoms, a halogenoalkyl group, an alkoxy group, or a phenoxy group that may have a substituent.

<2> A cationic curing agent, including:

porous particles; and a mixture carried on the porous particles, the mixture including a compound represented by Formula (1) below:

Formula (1)

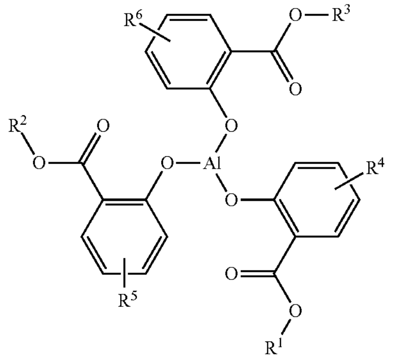

in which $R^1$ to $R^3$ are identical, and $R^4$ to $R^6$ are identical;

a compound represented by Formula (1) in which at least one of $R^1$ to $R^6$ is different, wherein in Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent; and a compound represented by Formula (2) below:

Formula (2)

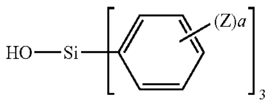

in which

Z is a hydrogen atom or an electron attractive group, and a is an integer of from 0 to 5.

<3> The cationic curing agent according to <1> or <2> above, wherein the porous particles are formed from a material including a polyurea resin.

<4> The cationic curing agent according to <3> above, wherein the material forming the porous particles further includes a vinyl resin.

<5> The cationic curing agent according to any one of <1> to <4> above, wherein the porous particles are porous inorganic particles.

<6> The cationic curing agent according to any one of <1> to <5> above, wherein surfaces of the porous particles include a reaction product of a silane compound.

<7> The cationic curing agent according to <6> above, wherein the silane compound is at least one compound selected from the group consisting of a compound represented by Formula (3) below and a compound represented by Formula (4) below:

Formula (3)

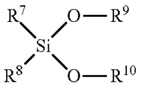

wherein in Formula (3), $R^7$ and $R^8$ are each an optionally branched alkyl group having from 1 to 18 carbon atoms, or a phenyl group that may have a substituent, $R^9$ and $R^{10}$, are each an optionally branched alkyl group having from 1 to 4 carbon atoms, and $R^7$ to $R^{10}$ may be identical to or different from each other, Formula (4)

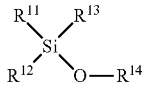

wherein in Formula (4), $R^{11}$ to $R^{13}$ are each an optionally branched alkyl group having from 1 to 18 carbon atoms, or a phenyl group that may have a substituent, $R^{14}$ is an optionally branched alkyl group having from 1 to 4 carbon atoms, and $R^{11}$ to $R^{14}$ may be identical to or different from each other.

<8> A method for producing a cationic curing agent, the method including:

dispersing, in an organic solvent, a compound represented by Formula (1) below:

Formula (1)

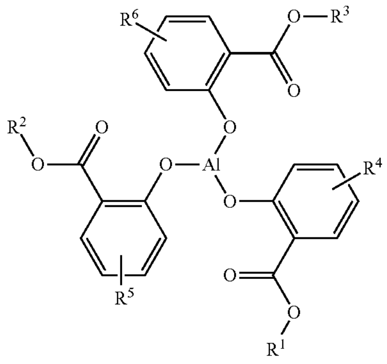

in which $R^1$ to $R^3$ are identical, and $R^4$ to $R^6$ are identical;

a compound represented by Formula (1) in which at least one of $R^1$ to $R^6$ is different, wherein in Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent; and porous particles; and then removing the solvent to produce the porous particles carrying a mixture that includes the compound represented by Formula (1) in which $R^1$ to $R^3$ are identical and $R^4$ to $R^6$ are identical and the compound represented by Formula (1) in which at least one of $R^1$ to $R^6$ is different.

<9> A method for producing a cationic curing agent, the method including:

dispersing, in an organic solvent, a compound represented by Formula (1) below:

Formula (1)

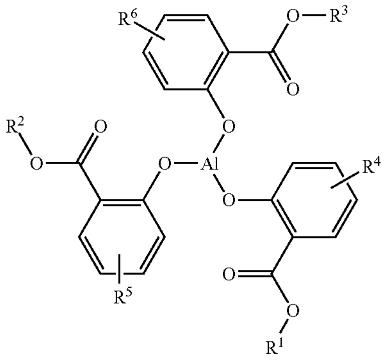

in which $R^1$ to $R^3$ are identical, and $R^4$ to $R^6$ are identical;

a compound represented by Formula (1) in which at least one of $R^1$ to $R^6$, is different, wherein in Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent;

a compound represented by Formula (2) below:

Formula (2)

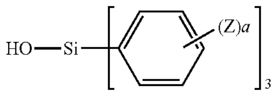

in which

Z is a hydrogen atom or an electron attractive group, and a is an integer of from 0 to 5; and porous particles; and then removing the solvent to produce the porous particles carrying a mixture that includes the compound represented by Formula (1) in which $R^1$ to $R^3$ are identical and $R^4$ to $R^6$ are identical, the compound represented by Formula (1) in which at least one of $R^1$ to $R^6$ is different, and the compound represented by Formula (2).

<10> A cationically curable composition, including:

a cationically curable component;

the cationic curing agent according to any one of <1> to <7> above; and an organic silane compound.

<11> The cationically curable composition according to <10> above, wherein the organic silane compound is represented by Formula (2) below:

Formula (2)

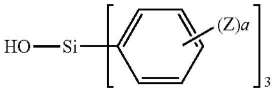

wherein in Formula (2), Z is a hydrogen atom or an electron attractive group, and a is an integer of from 0 to 5.

Advantageous Effects of Invention

The present invention can solve the above-described various problems existing in the art and achieve the above object, and can provide a cationic curing agent that has enhanced curing properties without degradation in latent properties and a cationically curable composition including the cationic curing agent.

DESCRIPTION OF EMBODIMENTS (Cationic Curing Agent)

A cationic curing agent of the present invention includes, in a first embodiment, porous particles and a mixture carried on the porous particles. The mixture includes a compound represented by Formula (1) below in which $R^1$ to $R^3$ are identical and $R^4$ to $R^6$ are identical and a compound represented by Formula (1) below in which at least one of $R^1$ to $R^6$ is different. The cationic curing agent of the first embodiment further includes other components, if necessary.

A cationic curing agent of the present invention includes, in a second embodiment, porous particles and a mixture carried on the porous particles. The mixture includes a compound represented by Formula (1) below in which $R^1$ to $R^3$ are identical and $R^4$ to $R^6$ are identical, a compound represented by Formula (1) below in which at least one of $R^1$ to $R^6$ is different, and a compound represented by Formula (2) below. The cationic curing agent of the second embodiment further includes other components, if necessary.

Formula (1)

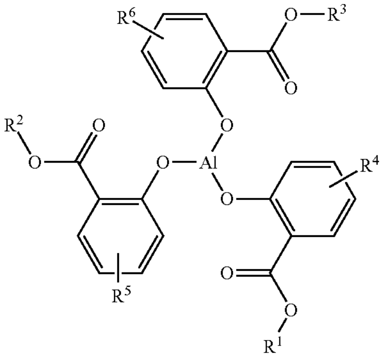

In Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent.

Formula (2)

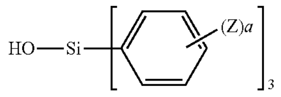

In Formula (2), Z is a hydrogen atom or an electron attractive group, and a is an integer of from 0 to 5.

In the cationic curing agent, the mixture including the compound represented by Formula (1) in which $R^1$ to $R^3$ are identical and $R^4$ to $R^6$ are identical and the compound represented by Formula (1) in which at least one of $R^1$ to $R^6$ is different, or the mixture including the compound represented by Formula (1) in which $R^1$ to $R^3$ are identical and $R^1$ to $R^6$ are identical, the compound represented by Formula (1) in which at least one of $R^1$ to $R^6$ is different, and the compound represented by Formula (2) is carried on the porous particles.

For example, the porous particles carry, in the pores thereof, the mixture including the compound represented by Formula (1) in which $R^1$ to $R^3$ are identical and $R^4$ to $R^6$ are identical and the compound represented by Formula (1) in which at least one of $R^1$ to $R^6$ is different, or the mixture including the compound represented by Formula (1) in which $R^1$ to $R^6$ are identical and $R^4$ to $R^6$ are identical, the compound represented by Formula (1) in which at least one of $R^1$ to $R^6$ is different, and the compound represented by Formula (2).

The cationic curing agent is a so-called latent curing agent.

In the cationic curing agent, the amount of the mixture, carried on the porous particle, of the compound represented by Formula (1) in which $R^1$ to $R^3$ are identical and $R^4$ to $R^6$ are identical and the compound represented by Formula (1) in which at least one of $R^1$ to $R^6$ is different, or the amount of the mixture, carried on the porous particle, of the compound represented by Formula (1) in which $R^1$ to $R^3$ are identical and $R^4$ to $R^6$ are identical, the compound represented by Formula (1) in which at least one of $R^1$ to $R^6$ is different, and the compound represented by Formula (2) is not particularly limited and may be appropriately selected in accordance with the intended purpose.

<Compound Represented by Formula (1)>

The alkyl group having from 1 to 18 carbon atoms for the $R^1$ to $R^3$ in Formula (1) is not particularly limited and may be appropriately selected in accordance with the intended purpose, but is preferably an alkyl group having from 2 to 10 carbon atoms and further preferably an alkyl group having from 2 to 8 carbon atoms.

The alkyl group having from 1 to 18 carbon atoms for the $R^1$ to $R^3$ may be in the form of a straight chain or a branched chain.

A substituent in the phenyl group that may have a substituent for the $R^1$ to $R^3$ is not particularly limited and may be appropriately selected in accordance with the intended purpose. Examples of the substituent include an alkyl group having from 1 to 18 carbon atoms, an alkoxy group having from 1 to 18 carbon atoms, and a halogen atom. Examples of the halogen atom include a fluorine atom, a chlorine atom, a bromine atom, and an iodine atom.

The alkyl group having from 1 to 4 carbon atoms for the $R^4$ to $R^6$ in Formula (1) is not particularly limited and may be appropriately selected in accordance with the intended purpose, but is preferably an alkyl group having 1 or 2 carbon atoms.

The halogenoalkyl group for the $R^4$ to $R^6$ is not particularly limited and may be appropriately selected in accordance with the intended purpose. Specific examples of the halogenoalkyl group include a trifluoromethyl group, a trichloromethyl group, and a tribromomethyl group.

The alkoxy group for the $R^4$ to $R^6$ is not particularly limited and may be appropriately selected in accordance with the intended purpose, but is preferably an alkoxy group having from 1 to 10 carbon atoms, more preferably an alkoxy group having from 1 to 6 carbon atoms, and particularly preferably an alkoxy group having from 1 to 4 carbon atoms. The carbon atoms of the alkoxy group may be arranged in the form of a straight chain or a branched chain.

The phenoxy group that may have a substituent for the $R^4$ to $R^6$ is not particularly limited and may be appropriately selected in accordance with the intended purpose.

Examples of the substituent in the phenoxy group that may have a substituent for the $R^4$ to $R^6$ include an alkyl group having from 1 to 10 carbon atoms, a halogenated alkyl group, an alkoxy group having from 1 to 10 carbon atoms, and a halogen atom.

Examples of the compound represented by Formula (1) include tris[2-(methoxycarbonyl)-phenoxy]aluminum, tris[2-(ethoxycarbonyl)-phenoxy]aluminum, tris[2-(butoxycarbonyl)-phenoxy]aluminum, tris[2-(methoxycarbonyl)-4-methylphenoxy]aluminum, and tris[2-(methoxycarbonyl)-5-methylphenoxy]aluminum.

In the present invention, the mixture including the compound represented by Formula (1) in which $R^1$ to $R^3$ are identical and $R^4$ to $R^6$ are identical and the compound represented by Formula (1) in which at least one of $R^1$ to $R^6$ is different, or the mixture including the compound represented by Formula (1) in which $R^1$ to $R^3$ are identical and $R^4$ to $R^6$ are identical, the compound represented by Formula (1) in which at least one of $R^1$ to $R^6$ is different, and the compound represented by Formula (2) is carried on the porous particle. With this configuration, higher curing properties can be obtained than when the compound represented by Formula (1) in which $R^1$ to $R^3$ are identical and $R^4$ to $R^6$ are identical (a compound having a single structure) is carried on the porous particle.

The abundance ratio between the compound represented by Formula (1) in which $R^1$ to $R^3$ are identical and $R^4$ to $R^6$ are identical and the compound represented by Formula (1) in which at least one of $R^1$ to $R^6$ is different carried on the porous particles cannot be accurately determined. Nonetheless, the presence or absence thereof and the structures thereof can be confirmed by treating a produced cationic curing agent with an appropriate solvent to elute the carried compounds thereon, followed by mass spectrometry. Examples of employable analysis methods include FD-MS.

Also, it is difficult to quantify the mixture itself of the compound represented by Formula (1) in which $R^1$ to $R^3$ are identical and $R^4$ to $R^6$ are identical and the compound represented by Formula (1) in which at least one of $R^1$ to $R^6$ is different. Nonetheless, the structure of the compound bound to aluminum represented by Formula (1) can be identified and quantified by, for example, treating a produced cationic curing agent with an appropriate solvent to elute the carried compounds thereon, further adding water to the elution to liberate the compound bound to aluminum, followed by analysis through GC-MS. In terms thereof, in order to achieve higher curing properties, the rate of the structure of the compound bound to aluminum is different from the total mass of the compound bound to aluminum preferably by 1% by mass or greater and more preferably 5% by mass or greater.

A method of synthesizing the compound represented by Formula (1) is not particularly limited and may be appropriately selected in accordance with the intended purpose. Examples of the method include a method of reacting aluminum alkoxide and a reactant in the presence or absence of a solvent at from room temperature to about 110° C. During the reaction, alcohol left from aluminum alkoxide may be distilled off.

A method of achieving a mixed state of the compound represented by Formula (1) in which $R^1$ to $R^3$ are identical and $R^4$ to $R^6$ are identical and the compound represented by Formula (1) in which at least one of $R^1$ to $R^6$ is different can be using for reaction a plurality of compounds to be reacted with aluminum alkoxide during synthesis of the compound represented by Formula (1). Also, the ratios of the compounds in the mixed state can be changed by carrying a single compound represented by Formula (1) and the compounds in the mixed state produced by the above method at varied ratios.

It is difficult to accurately determine the mixing ratio of each of the aluminum compounds after the synthesis of the compounds represented by Formula (1). Nonetheless, in the same manner as in the compound represented by Formula (1) carried on the porous particle, the structure of the compound bound to aluminum can be identified and quantified.

Therefore, when the compound bound to aluminum is a single substance as a result of analysis, the compound represented by Formula (1) can be regarded as a single compound.

<Compound Represented by Formula (2)>

Formula (2)

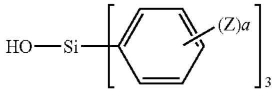

In Formula (2), Z is a hydrogen atom or an electron attractive group, and a is an integer of from 0 to 5.

Examples of the electron attractive group include a halogen group (e.g., a chloro group and a bromo group), a trifluoromethyl group, a nitro group, a sulfo group, a carboxyl group, an alkoxycarbonyl group (e.g., a methoxycarbonyl group and an ethoxycarbonyl group), and a formyl group.

Examples of the compound represented by Formula (2) include triphenylsilanol, tris[(4-chloro)phenyl]silanol, tris[(4-trifluoromethyl)phenyl]silanol, tris[(3,5-dichloro)phenyl]silanol, and tris(pentafluorophenyl)silanol.

In the present invention, a mixing ratio between the compound represented by Formula (2) and the mixture including the compound represented by Formula (1) in which $R^1$ to $R^3$ are identical and $R^4$ to $R^6$ are identical and the compound represented by Formula (1) in which at least one of $R^1$ to $R^6$ is different may be appropriately selected depending on effects to be obtainable. Relative to 100 parts by mass of the mixture including the compound represented by Formula (1) in which $R^1$ to $R^3$ are identical and $R^4$ to $R^6$ are identical and the compound represented by Formula (1) in which at least one of $R^1$ to $R^6$ is different, the compound represented by Formula (2) is preferably 10 parts by mass or more and 200 parts by mass or less, and more preferably 20 parts by mass or more and 100 parts by mass or less.

When the compound represented by Formula (1) in which $R^1$ to $R^3$ are identical and $R^4$ to $R^6$ are identical, the compound represented by Formula (1) in which at least one of $R^1$ to $R^6$ is different, and the compound represented by Formula (2) are mixed in an organic solvent at the above mixing ratio, the compound represented by Formula (1) in which $R^1$ to $R^3$ are identical and $R^4$ to $R^6$ are identical, the compound represented by Formula (1) in which at least one of $R^1$ to $R^6$ is different, and the compound represented by Formula (2) may be partially reacted to produce a compound represented by Formula (5) below or a compound represented by Formula (6) below.

Formula (5)

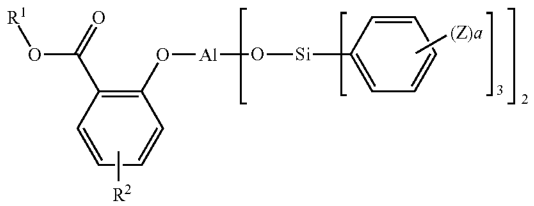

In Formula (5), $R^1$ is an optionally branched alkyl group having from 1 to 18 carbon atoms, or a phenyl group that may have a substituent, and these may be identical or different. $R^2$ is a hydrogen atom, an optionally branched alkyl group having from 1 to 4 carbon atoms, a halogenoalkyl group, an alkoxy group, or a phenoxy group that may have a substituent, and these may be identical or different. Z is a hydrogen atom or an electron attractive group, and a is an integer of from 0 to 5.

Formula (6)

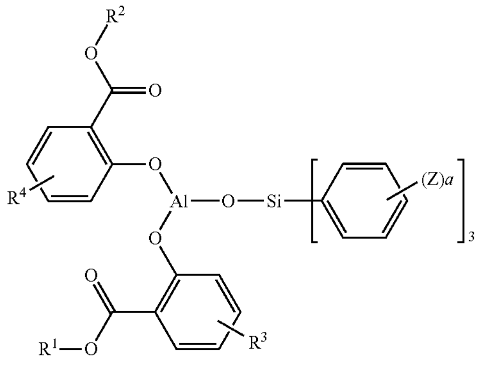

In Formula (6), $R^1$ and $R^2$ are each an optionally branched alkyl group having from 1 to 18 carbon atoms, or a phenyl group that may have a substituent, and $R^4$ and $R^2$ may be identical or different. $R^3$ and $R^4$ are each a hydrogen atom, an optionally branched alkyl group having from 1 to 4 carbon atoms, a halogenoalkyl group, an alkoxy group, or a phenoxy group that may have a substituent, and $R^3$ and $R^4$ may be identical or different. Z is a hydrogen atom or an electron attractive group, and a is an integer of from 0 to 5.

In the present invention, the mixture including the compound represented by Formula (1) in which $R^1$ to $R^3$ are identical and $R^4$ to $R^6$ are identical, the compound represented by Formula (1) in which at least one of $R^1$ to $R^6$ is different, and the compound represented by Formula (2) includes the compound represented by Formula (5) or Formula (6) as well.

The compound represented by Formula (5) or Formula (6) is an unstable compound and decomposes by extraction. When, however, the compound represented by Formula (5) or Formula (6) is carried by the porous particles in the state of a mixture with the compound represented by Formula (1) in which $R^1$ to $R^3$ are identical and $R^4$ to $R^6$ are identical and the compound represented by Formula (1) in which at least one of $R^4$ to $R^6$ is different, the compound represented by Formula (5) or Formula (6) can be stabilized to exist stably in the porous particle.

Whether the mixture including the compound represented by Formula (1) in which $R^1$ to $R^3$ are identical and $R^4$ to $R^6$ are identical, the compound represented by Formula (1) in which at least one of $R^1$ to $R^6$ is different, and the compound represented by Formula (2) is carried inside of the porous particles (in the pores thereof) can be confirmed by analyzing silicon (Si) and Al in the pores through SEM/EDX of the cross section of the porous particle.

<Porous Particles>

The porous particles are not particularly limited and may be appropriately selected in accordance with the intended purpose, as long as the porous particles are particles having many pores. Examples of the porous particles include porous organic resin particles formed of an organic resin and porous inorganic particles formed of an inorganic compound.

The average pore diameter of the pores of the porous particles is not particularly limited and may be appropriately selected in accordance with the intended purpose. The average pore diameter is preferably 1 nm or more and 300 nm or less and more preferably 5 nm or more and 150 nm or less.

<<Porous Organic Resin Particles>>

The porous organic resin particles are not particularly limited and may be appropriately selected in accordance with the intended purpose, as long as the porous organic resin particles are porous particles formed of an organic resin.

The organic resin is not particularly limited and may be appropriately selected in accordance with the intended purpose. The organic resin is preferably a polyurea resin. Specifically, the porous organic resin particles are preferably formed from a material including a polyurea resin.

The material forming the porous organic resin particles may further include a vinyl resin.

<<<Polyurea Resin>>>

The polyurea resin is a resin including a urea bond.

The polyurea resin forming the porous organic resin particles can be obtained by, for example, polymerizing a polyfunctional isocyanate compound in an emulsion. The polyurea resin may include a bond that is derived from an isocyanate group but is not a urea bond (e.g., a urethane bond).

—Polyfunctional Isocyanate Compound—

The polyfunctional isocyanate compound includes, in a molecule thereof, two or more isocyanate groups, preferably three isocyanate groups. More preferable examples of such a trifunctional isocyanate compound include: a TMP adduct represented by Formula (7) below obtained by reacting 3 moles of a diisocyanate compound with 1 mole of trimethylolpropane; an isocyanurate represented by Formula (8) below obtained by self-condensing 3 moles of a diisocyanate compound; and a biuret represented by Formula (9) below obtained by, among 3 moles of a diisocyanate compound, condensing 1 mole of the diisocyanate compound to a diisocyanate urea obtained from 2 moles of the diisocyanate compound.

Formula (7)

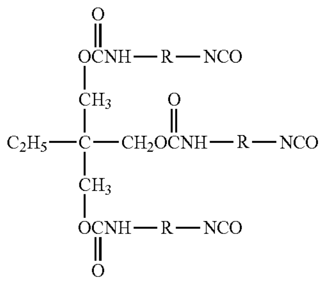

Formula (8)

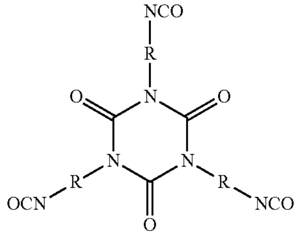

Formula (9)

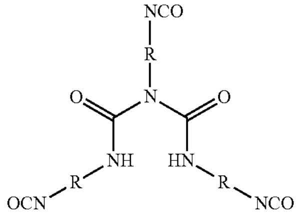

In Formulae (7) to (9), the substituent R is a moiety remaining after removing isocyanate groups from a diisocyanate compound. Specific examples of such a diisocyanate compound include toluene 2,4-diisocyanate, toluene 2,6-diisocyanate, m-xylylene diisocyanate, hexamethylene diisocyanate, hexahydro-m-xylylene diisocyanate, isophorone diisocyanate, and methylenediphenyl-4,4'-diisocyanate.

<<<Vinyl Resin>>>

The vinyl resin is a resin obtained through polymerization of a radical-polymerizable vinyl compound.

The vinyl resin improves mechanical properties of the porous organic resin particles. By improving the mechanical properties of the porous organic resin particles, it is possible to improve thermal response of a cationically curable composition at the time of curing, in particular, the resulting cationically curable composition exhibits sharp thermal response in a low-temperature region.

The vinyl resin can be obtained by, for example, adding a radical-polymerizable vinyl compound to an emulsion including a polyfunctional isocyanate compound, and performing radical polymerization of the radical-polymerizable vinyl compound at the same time as when the polyfunctional isocyanate compound is polymerized in the emulsion.

—Radical-Polymerizable Vinyl Compound—

The radical-polymerizable vinyl compound includes a radical-polymerizable carbon-carbon unsaturated bond in a molecule thereof.

The radical-polymerizable vinyl compound includes a monofunctional radical-polymerizable compound and a polyfunctional radical-polymerizable compound.

The radical-polymerizable vinyl compound preferably includes a polyfunctional radical-polymerizable compound. This is because the polyfunctional radical-polymerizable compound more easily realizes sharp thermal response at a low-temperature region. Therefore, the radical-polymerizable vinyl compound preferably includes a polyfunctional radical-polymerizable compound in an amount of 30% by mass or greater, and more preferably includes a polyfunctional radical-polymerizable compound in an amount of 50% by mass or greater.

Examples of the monofunctional radical-polymerizable compound include monofunctional vinyl compounds (e.g., styrene and methylstyrene) and monofunctional (meth)acrylate compounds (e.g., butyl acrylate).

Examples of the polyfunctional radical-polymerizable compound include polyfunctional vinyl compounds (e.g., divinylbenzene and divinyl adipate) and polyfunctional (meth)acrylate compounds (e.g., 1,6-hexanediol diacrylate and trimethylolpropane triacrylate).

Among these, in view of latent properties and thermal response, polyfunctional vinyl compounds are preferable, and divinylbenzene is particularly preferable.

Note that, a polyfunctional radical-polymerizable compound may be formed of a polyfunctional vinyl compound and a polyfunctional (meth)acrylate compound. Use of the polyfunctional vinyl compound and the polyfunctional (meth)acrylate compound in combination can produce such effects as changing thermal response and introducing a reactive functional group.

The amount of the radical-polymerizable vinyl compound to be used is not particularly limited and may be appropriately selected in accordance with the intended purpose. The amount thereof is preferably 1 part by mass or more and 80 parts by mass or less and more preferably 10 parts by mass or more and 60 parts by mass or less relative to 100 parts by mass of the polyfunctional isocyanate compound.

The average particle diameter of the porous organic resin particles is not particularly limited and may be appropriately selected in accordance with the intended purpose. The average particle diameter thereof is preferably 0.5 μm or more and 20 μm or less, more preferably 1 μm or more and 10 μm or less, and particularly preferably 1 μm or more and 5 μm or less.

<<Porous Inorganic Particles>>

The porous inorganic particles are not particularly limited and may be appropriately selected in accordance with the intended purpose, as long as the porous inorganic particles are porous particles formed of an inorganic compound.

Examples of a material of the porous inorganic particles include silicon oxide, aluminum silicate, aluminum oxide, zirconium oxide, potassium oxide, calcium oxide, titanium oxide, calcium borate, sodium borosilicate, sodium oxide, and phosphoric acid salt. These may be used alone or in combination.

Examples of the porous inorganic particles include porous silica particles, porous alumina particles, porous titania particles, porous zirconia particles, and zeolite. These may be used alone or in combination.

The average particle diameter of the porous inorganic particles is not particularly limited and may be appropriately selected in accordance with the intended purpose. The average particle diameter thereof is preferably 50 nm or more and 5,000 μm or less, more preferably 250 nm or more and 1,000 μm or less, and particularly preferably 500 nm or more and 200 μm or less.

<<Surfaces of Porous Particles>>

The porous particles preferably include a reaction product of a silane compound on surfaces thereof in view of enhancing latent properties.

The reaction product is obtained through reaction of the silane compound.

The reaction product is present on surfaces of the porous particles.

In the porous particles carrying the mixture that includes the compound represented by Formula (1) in which $R^1$ to $R^3$ are identical and $R^4$ to $R^6$ are identical and the compound represented by Formula (1) in which at least one of $R^1$ to $R^6$ is different, the mixture including the compound represented by Formula (1) in which $R^1$ to $R^3$ are identical and $R^4$ to $R^6$ are identical and the compound represented by Formula (1) in which at least one of $R^1$ to $R^6$ is different is present on surfaces of the porous particles as well as inside of the porous particles, in view of the structures thereof.

In this state, when an alicyclic epoxy resin having high reactivity is used as a cationically curable component in the below-described cationically curable composition, the cationically curable composition including the cationic curing agent significantly increases in viscosity over time.

Therefore, the mixture including the compound represented by Formula (1) in which $R^1$ to $R^3$ are identical and $R^4$ to $R^6$ are identical and the compound represented by Formula (1) in which at least one of $R^1$ to $R^6$ is different, present on the surfaces of the porous particles, is preferably deactivated with a silane compound, as described below.

The silane compound is preferably an alkoxysilane compound, and is particularly preferably a compound represented by Formula (3) below or Formula (4) below.

Formula (3)

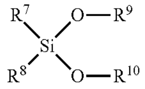

In Formula (3), $R^7$ and $R^8$ are each an optionally branched alkyl group having from 1 to 18 carbon atoms, or a phenyl group that may have a substituent, $R^9$ and $R^{10}$ are each an optionally branched alkyl group having from 1 to 4 carbon atoms, and the $R^7$ to $R^{10}$ may be identical to or different from each other.

Formula (4)

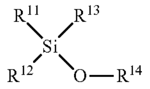

In Formula (4), $R^{11}$ to $R^{18}$ are each an optionally branched alkyl group having from 1 to 18 carbon atoms, or a phenyl group that may have a substituent, $R^{14}$ is an optionally branched alkyl group having from 1 to 4 carbon atoms, and the $R^{11}$ to $R^{14}$ may be identical to or different from each other.

The alkyl group having from 1 to 18 carbon atoms for the $R^7$ and $R^8$ in Formula (3) is not particularly limited and may be appropriately selected in accordance with the intended purpose, but is preferably an alkyl group having from 1 to 10 carbon atoms and further preferably an alkyl group having from 1 to 8 carbon atoms.

The alkyl group having from 1 to 18 carbon atoms for the $R^7$ and $R^8$ may be in the form of a straight chain or a branched chain. Alternatively, it may have a cyclic structure.

The substituent in the phenyl group that may have a substituent for the $R^7$ and $R^8$ is not particularly limited and may be appropriately selected in accordance with the intended purpose. Examples of the substituent include an alkyl group having from 1 to 18 carbon atoms, an alkoxy group having from 1 to 18 carbon atoms, and a halogen atom.

Examples of the halogen atom include a fluorine atom, a chlorine atom, a bromine atom, and an iodine atom.

The alkyl group having from 1 to 4 carbon atoms for the $R^9$ and $R^{10}$ is not particularly limited and may be appropriately selected in accordance with the intended purpose, but is preferably an alkyl group having 1 or 2 carbon atoms.

The alkyl group having from 1 to 18 carbon atoms for the $R^{11}$ to $R^{13}$ in Formula (4) is not particularly limited and may be appropriately selected in accordance with the intended purpose, but is preferably an alkyl group having from 1 to 10 carbon atoms and further preferably an alkyl group having from 1 to 8 carbon atoms.

The alkyl group having from 1 to 18 carbon atoms for the $R^{11}$ to $R^{13}$ may be in the form of a straight chain or a branched chain. Alternatively, it may have a cyclic structure.

The substituent in the phenyl group that may have a substituent for the $R^{11}$ to $R^{13}$ is not particularly limited and may be appropriately selected in accordance with the intended purpose. Examples of the substituent include an alkyl group having from 1 to 18 carbon atoms, an alkoxy group having from 1 to 18 carbon atoms, and a halogen atom. Examples of the halogen atom include a fluorine atom, a chlorine atom, a bromine atom, and an iodine atom.

The alkyl group having from 1 to 4 carbon atoms for the $R^{14}$ is not particularly limited and may be appropriately selected in accordance with the intended purpose, but is preferably an alkyl group having 1 or 2 carbon atoms.

When the mixture including the compound represented by Formula (1) in which $R^1$ to $R^3$ are identical and $R^4$ to $R^6$ are identical and the compound represented by Formula (1) in which at least one of $R^1$ to $R^6$ is different carried on the porous particles, especially present on the surfaces of the porous particles is reacted with an alkoxysilyl group in the molecule of the compound of Formula (3) or Formula (4), the mixture including the compound represented by Formula (1) in which $R^1$ to $R^3$ are identical and $R^4$ to $R^6$ are identical and the compound represented by Formula (1) in which at least one of $R^1$ to $R^6$ is different, present on the surfaces of the porous particles, can be effectively deactivated to achieve better latent properties, which is preferable. Also, use of the compound of Formula (3) or Formula (4) makes it possible to reduce the number of siloxane bond chains on the surfaces of the porous particles. As a result, during curing of an epoxy resin, the siloxane bond chains do not readily inhibit elution, from the porous particles, of the mixture including the compound represented by Formula (1) in which $R^1$ to $R^3$ are identical and $R^4$ to $R^6$ are identical and the compound represented by Formula (1) in which at least one of $R^1$ to $R^6$ is different present inside of the porous particles. This can maintain the curing properties.

(Method of Producing Cationic Curing Agent)

A method of the present invention for producing a cationic curing agent includes, in a first embodiment, dispersing, in an organic solvent, a compound represented by Formula (1) below in which $R^1$ to $R^3$ are identical and $R^4$ to $R^6$ are identical, a compound represented by Formula (1) below in which at least one of $R^1$ to $R^6$ is different, and porous particles and then removing the solvent to produce the porous particles carrying a mixture that includes the compound represented by Formula (1) in which $R^1$ to $R^3$ are identical and $R^4$ to $R^6$ are identical and the compound represented by Formula (1) in which at least one of $R^1$ to $R^6$ is different.

Formula (1)

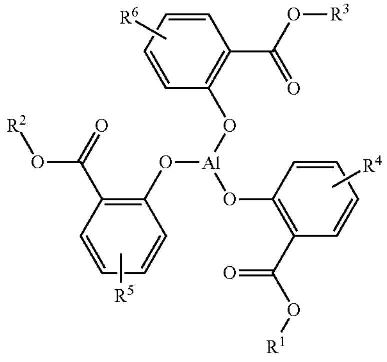

In Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent.

A method of the present invention for producing a cationic curing agent includes, in a second embodiment, dispersing, in an organic solvent, a compound represented by Formula (1) below in which $R^1$ to $R^3$ are identical and $R^4$ to $R^6$ are identical, a compound represented by Formula (1) below in which at least one of $R^1$ to $R^6$ is different, a compound represented by Formula (2) below, and porous particles and then removing the solvent to produce the porous particles carrying a mixture that includes the compound represented by Formula (1) in which $R^1$ to $R^3$ are identical and $R^4$ to $R^6$ are identical, the compound represented by Formula (1) in which at least one of $R^1$ to $R^6$ is different, and the compound represented by Formula (2).

Formula (1)

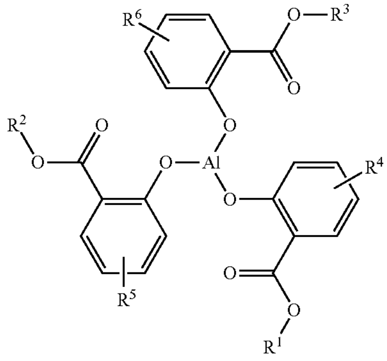

In Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent.

Formula (2)

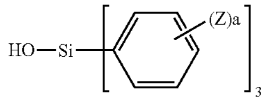

In Formula (2), Z is a hydrogen atom or an electron attractive group, and a is an integer of from 0 to 5.

A method of producing the porous particles carrying the mixture is preferably a method of dispersing, in an organic solvent, the compound represented by Formula (1) in which $R^1$ to $R^3$ are identical and $R^1$ to $R^6$ are identical, the compound represented by Formula (1) in which at least one of $R^1$ to $R^6$ is different, and the porous particles and then removing the solvent, or a method of dispersing, in an organic solvent, the mixture including the compound represented by Formula (1) in which $R^1$ to $R^3$ are identical and $R^4$ to $R^6$ are identical, the compound represented by Formula (1) in which at least one of $R^1$ to $R^6$ is different, the compound represented by Formula (2), and the porous particles and then removing the solvent.

The method of dispersing the compounds and the porous particles in the organic solvent is preferably a method of mixing and dissolving the mixture including the compound represented by Formula (1) in which $R^1$ to $R^3$ are identical and $R^4$ to $R^6$ are identical and the compound represented by Formula (1) in which at least one of $R^1$ to $R^6$ is different, or the mixture including the compound represented by Formula (1) in which $R^1$ to $R^3$ are identical and $R^4$ to $R^6$ are identical, the compound represented by Formula (1) in which at least one of $R^1$ to $R^6$ is different, and the compound represented by Formula (2) in the organic solvent in advance and then charging the porous particles to the resulting solution. If necessary, the mixture that has been charged with the porous particles may be dispersed with a homogenizer or ultrasonic waves.

Examples of the method of removing the solvent include a method by heating, a method by reducing the pressure, and a combination of these methods.

The organic solvent used is appropriately selected in accordance with the intended purpose but preferably has a boiling point of 150° C. or lower. Examples thereof include methanol, ethanol, isopropanol, acetone, methyl ethyl ketone, methyl acetate, ethyl acetate, toluene, xylene, acetonitrile, and tetrahydrofuran.

In order to retain flowability after distilling off the organic solvent, it is also preferable to add, at the time of distilling off the organic solvent, olefin oil or wax, ester oil or wax, or silicone oil or wax that does not volatilize under conditions for distilling off the organic solvent.

A method of forming a reaction product of a silane coupling agent on the surfaces of the porous particles can be performed referring to, for example, the description of JP-A No. 2016-056274.

(Cationically Curable Composition)

A cationically curable composition of the present invention includes a cationically curable component and a cationic curing agent. The cationically curable composition preferably includes an organic silane compound and if necessary, further includes other components.

<Cationically Curable Component>

The cationically curable component is not particularly limited and may be appropriately selected in accordance with the intended purpose, as long as the cationically curable component is an organic material that can be cured through cationic curing. Examples of the cationically curable component include an epoxy resin, an oxetane compound, and a vinyl ether resin.

<<Epoxy Resin>>

The epoxy resin is not particularly limited and may be appropriately selected in accordance with the intended purpose. Examples of the epoxy resin include a glycidyl ether-type epoxy resin and an alicyclic epoxy resin.

For example, the glycidyl ether-type epoxy resin may be in the state of a liquid or a solid. The epoxy equivalent of the glycidyl ether-type epoxy resin is typically from about 100 to about 4,000, and the glycidyl ether-type epoxy resin preferably includes two or more epoxy groups in a molecule thereof. Examples of the glycidyl ether-type epoxy resin include a bisphenol A-type epoxy resin, a bisphenol F-type epoxy resin, a phenol novolac-type epoxy resin, a cresol novolac-type epoxy resin, and an ester-type epoxy resin. Among these, a bisphenol A-type epoxy resin is preferably used in view of the properties of the resin. These epoxy resins include monomers and oligomers as well.

The alicyclic epoxy resin is not particularly limited and may be appropriately selected in accordance with the intended purpose. Examples of the alicyclic epoxy resin include vinyl cyclopentadiene dioxide, vinyl cyclohexene mono- or dioxide, dicyclopentadiene oxide, epoxy-[epoxy-oxaspiro $C_{8-15}$ alkyl]-cyclo $C_{5-12}$ alkane (e.g., 3,4-epoxy-1-[8,9-epoxy-2,4-dioxaspiro[5.5]undecan-3-yl]-cyclohexane), 3,4-epoxycyclohexylmethyl-3',4'-epoxycyclohexane carboxylate, epoxy $C_{5-12}$ cycloalkyl $C_{1-3}$ alkylepoxy $C_{5-12}$ cycloalkane carboxylate (e.g., 4,5-epoxycyclooctylmethyl-4',5'-epoxycyclooctane carboxylate), and bis($C_{1-3}$ alkylepoxy $C_{5-12}$ cycloalkyl $C_{1-3}$ alkyl)dicarboxylate (e.g., bis(2-methyl-3,4-epoxycyclohexylmethyl)adipate). These may be used alone or in combination.

As the alicyclic epoxy resin, 3,4-epoxycyclohexylmethyl-3',4'-epoxycyclohexane carboxylate [product name: CELLOXIDE #2021P, available from Daicel Corporation, epoxy equivalent: 128 to 140] is preferably used because it can be easily obtained as a commercially available product.

Note that, in the list of the examples above, the references "$C_{8-15}$", "$C_{5-12}$", and "$C_{1-3}$" respectively mean to have from 8 to 15 carbon atoms, from 5 to 12 carbon atoms, and from 1 to 3 carbon atoms, and indicate that each of the compounds accompanied therewith can have some different structures.

One example of the structural formula of the alicyclic epoxy resin is given below.

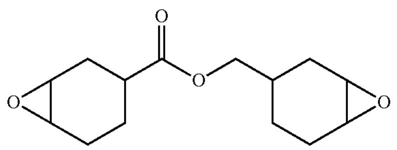 [SMILES: O=C(OCC1CCC2OC2C1)C1CCC2OC2C1]

<<Oxetane Compound>>

In the cationically curable composition, when the oxetane compound is used in combination with the epoxy resin, the exothermic peak of the cationically curable composition can be made sharp.

Examples of the oxetane compound include 3-ethyl-3-hydroxymethyloxetane, 1,4-bis{[(3-ethyl-3-oxetanyl)methoxy]methyl}benzene, bis[(3-ethyl-3-oxetanyl)methoxymethyl]biphenyl, 1,4-benzenedicarboxylic acid bis[(3-ethyl-3-oxetanyl)]methyl ester, 3-ethyl-3-(phenoxymethyl)oxetane, 3-ethyl-3-(2-ethylhexyloxymethyl)oxetane, di[1-ethyl(3-oxetanyl)]

methyl ether, 3-ethyl-3-{[3-(triethoxysilyl)propoxy]methyl}oxetane, oxetanylsilsesquioxane, and phenol novolac oxetane. These may be used alone or in combination.

The amount of the cationically curable component in the cationically curable composition is not particularly limited and may be appropriately selected in accordance with the intended purpose. The amount thereof is preferably 30% by mass or more and 99% by mass or less, more preferably 50% by mass or more and 98% by mass or less, and particularly preferably 70% by mass or more and 97% by mass or less.

Note that, the above amount is an amount thereof in the non-volatile components of the cationically curable composition. The same as above applies hereinafter.

<Cationic Curing Agent>

The cationic curing agent is the cationic curing agent of the present invention.

The amount of the cationic curing agent in the cationically curable composition is not particularly limited and may be appropriately selected in accordance with the intended purpose. The amount thereof is preferably 1 part by mass or more and 70 parts by mass or less and more preferably 1 part by mass or more and 50 parts by mass or less relative to 100 parts by mass of the cationically-curable component. When the above amount is less than 1 part by mass, curing properties may become lower. When the amount is more than 70 parts by mass, resin properties of a cured product (e.g., flexibility) may become lower.

<Organic Silane Compound>

As described in paragraphs [0007] to [0010] of JP-A No. 2002-212537, the organic silane compound has a function of initiating cationic polymerization of an epoxy resin by working together with an aluminum chelate in a latent curing agent.

Also in the cationically curable composition, the effect of accelerating curing of the cationically curable component can be obtained by using the cationic curing agent and the organic silane compound in combination.

The organic silane compound is, for example, an arylsilanol compound and a silane coupling agent.

Examples of the organic silane compound include a highly sterically hindered silanol compound and a silane coupling agent including from one to three lower alkoxy groups in a molecule thereof. Note that, a group reactive with a functional group of the cationically curable component, such as a vinyl group, a styryl group, an acryloyloxy group, a methacryloyloxy group, an epoxy group, an amino group, and a mercapto group, may be included in a molecule of the silane coupling agent. A coupling agent including an amino group or a mercapto group can be used when the amino group or the mercapto group does not substantially trap generated cation species at the time of cationic curing.

<<Arylsilanol Compound>>

The arylsilanol compound is, for example, represented by Formula (10) below.

$$(Ar)_mSi(OH)_n \qquad \text{Formula (10)}$$

In Formula (10), m is 2 or 3, preferably 3, the sum of m and n is 4, and Ar is an aryl group that may have a substituent.

The arylsilanol compound represented by Formula (10) is a mono-ol compound or a diol compound.

"Ar" in Formula (10) is an aryl group that may have a substituent.

Examples of the aryl group include a phenyl group, a naphthyl group (e.g., a 1-naphthyl group and a 2-naphthyl group), an anthracenyl group (e.g., a 1-anthracenyl group, a 2-anthracenyl group, a 9-anthracenyl group, and a benzo[a]-9-anthracenyl group), a phenallyl group (e.g., a 3-phenallyl group and a 9-phenallyl group), a pyrenyl group (e.g., a 1-pyrenyl group), an azulenyl group, a fluorenyl group, a biphenyl group (e.g., a 2-biphenyl group, a 3-biphenyl group, and a 4-biphenyl group), a thienyl group, a furyl group, a pyrrolyl group, an imidazolyl group, and a pyridyl group. These may be used alone or in combination. Among these, a phenyl group is preferable in view of availability and cost thereof. The "Ar" s present in the number of "m" may be all identical or may be different, but the "Ar" s are preferably all identical in view of easy availability These aryl groups may each have, for example, 1 to 5 substituents.

Examples of the substituent include an electron attractive group and an electron donative group.

Examples of the electron attractive group include a halogen group (e.g., a chloro group and a bromo group), a trifluoromethyl group, a nitro group, a sulfo group, a carboxyl group, an alkoxycarbonyl group (e.g., a methoxycarbonyl group and an ethoxycarbonyl group), and a formyl group.

Examples of the electron donative group include an alkyl group (e.g., a methyl group, an ethyl group, and a propyl group), an alkoxy group (e.g., a methoxy group and an ethoxy group), a hydroxyl group, an amino group, a monoalkylamino group (e.g., a monomethylamino group), and a dialkylamino group (e.g., a dimethylamino group).

Specific examples of the phenyl group having a substituent include a 2-methylphenyl group, a 3-methylphenyl group, a 4-methylphenyl group, a 2,6-dimethylphenyl group, a 3,5-dimethylphenyl group, a 2,4-dimethylphenyl group, a 2,3-dimethylphenyl group, a 2,5-dimethylphenyl group, a 3,4-dimethylphenyl group, a 2,4,6-trimethylphenyl group, a 2-ethylphenyl group, and a 4-ethylphenyl group.

Note that, use of an electron attractive group as a substituent can increase acidity of a hydroxyl group of a silanol group. Use of an electron donative group as a substituent can decrease acidity of a hydroxyl group of a silanol group. Therefore, curing properties can be controlled by a substituent.

The "Ar" s present in the number of "m" may have different substituents, but preferably have identical substituents in view of easy availability. Alternatively, some of the "Ar" s may have substituents and the other "Ar" s may have no substituents.

The arylsilanol compound is preferably the compound represented by Formula (2) in view of accelerating cationic polymerization.

In the present invention, the compound represented by Formula (2) carried inside of the cationic curing agent and the compound represented by Formula (2) used in the cationically curable composition may be identical or different.

<<Silane Coupling Agent>>

The silane coupling agent includes 1 to 3 lower alkoxy groups in a molecule thereof. The silane coupling agent may include, in a molecule thereof, a group reactive with a functional group of a thermosetting resin, such as a vinyl group, a styryl group, an acryloyloxy group, a methacryloyloxy group, an epoxy group, an amino group, and a mercapto group. Note that, a coupling agent including an amino group or a mercapto group can be used when the amino group or mercapto group does not substantially trap generated cationic species. This is because the latent curing agent used in the present invention is a cationic curing agent.

Examples of the silane coupling agent include vinyltris (β-methoxyethoxy)silane, vinyltriethoxysilane, vinyltrimethoxysilane, γ-styryltrimethoxysilane, γ-methacryloxypropyltrimethoxysilane, γ-acryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane. These may be used alone or in combination.

The amount of the organic silane compound in the cationically curable composition is not particularly limited and may be appropriately selected in accordance with the intended purpose. The amount thereof is preferably 50 parts by mass or more and 500 parts by mass or less and more preferably 100 parts by mass or more and 300 parts by mass or less relative to 100 parts by mass of the cationic curing agent.

EXAMPLES

The present invention will be described below by way of Examples. The present invention should not be construed as being limited to the Examples.

Production Example 1

Synthesis of Compound 1

In a state where $N_2$ was being introduced into a 500 mL three-necked flask equipped with a stirrer, a thermometer, and a nitrogen-introducing tube, 5.0 g of aluminum isopropoxide (obtained from TOKYO CHEMICAL INDUSTRY Co., Ltd.) and 200 g of heptane were charged to the flask. While the mixture was being stirred at room temperature, 20.5 g of ethyl salicylate (obtained from TOKYO CHEMICAL INDUSTRY Co., Ltd.) was charged thereto, followed by reaction at room temperature for 24 hours. Crystals gradually precipitated after initiation of the reaction.

After completion of reaction, the reaction mixture was filtered under reduced pressure to recover the crystals. The crystals were washed with heptane, followed by drying at room temperature under reduced pressure for 24 hours, to obtain 15.8 g of Compound 1 of the following structural formula, as pale red crystals.

Compound 1 was dissolved in acetone, and the solution was subjected to 1, mass spectrometry through FD-MS (obtained from JEOL Ltd., JMS-600H). The mass spectrometry gave a mass spectrum with the only base peak at an m/z value of 522 (indicating a compound where three ethyl salicylates are bound to aluminum).

Separately, 1 g of Compound 1 was dissolved in 10 g of tetrahydrofuran (THF). Further, 0.1 g of pure water was added to the solution, followed by stirring for a while. After filtration, the resulting product was analyzed through GC-MS (obtained from Agilent Technologies, Inc., 6890/5975MSD) and as a result the peak of ethyl salicylate only was obtained.

Compound 1

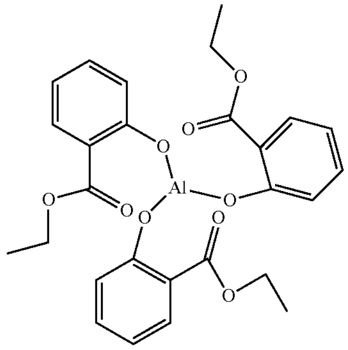

Production Example 2

Synthesis of Compound 2

In a state where $N_2$ was being introduced into a 500 mL three-necked flask equipped with a stirrer, a thermometer, and a nitrogen-introducing tube, 10.0 g of aluminum isopropoxide (obtained from TOKYO CHEMICAL INDUSTRY Co., Ltd.) and 200 g of heptane were charged to the flask. While the mixture was being stirred at room temperature, 19.7 g of ethyl salicylate (obtained from TOKYO CHEMICAL INDUSTRY Co., Ltd.) and 4.92 g of isopropyl salicylate (obtained from TOKYO CHEMICAL INDUSTRY Co., Ltd.) were charged thereto, followed by reaction at room temperature for 24 hours. Crystals gradually precipitated after initiation of the reaction.

After completion of reaction, the reaction mixture was filtered under reduced pressure to recover the crystals. The crystals were washed with heptane, followed by drying at room temperature under reduced pressure for 24 hours, to obtain 17.2 g of Compound 2 as pale red crystals.

Compound 2 obtained was dissolved in acetone, and the solution was subjected to mass spectrometry through FD-MS in the same manner as in Production Example 1. The mass spectrometry gave a mass spectrum with the base peaks at an m/z value of 522 (indicating a compound where three ethyl salicylates are bound to aluminum), at an m/z value of 536 (indicating a compound where two ethyl salicylates and one isopropyl salicylate are bound to aluminum), and at an m/z value of 550 (indicating a compound where one ethyl salicylate and two isopropyl salicylates are bound to aluminum).

Separately, 1 g of Compound 2 was dissolved in 10 g of tetrahydrofuran (THF). Further, 0.1 g of pure water was added to the solution, followed by stirring for a while. After filtration, the resulting product was analyzed through GC-MS in the same manner as in Production Example 1 and as a result the peak of ethyl salicylate and the peak of isopropyl salicylate were obtained. When a mass ratio was evaluated from the areas of these peaks, the ratio of ethyl salicylate: isopropyl salicylate was found to be 84:16.

Production Example 3

Production of Porous Particles A 800 parts by mass of distilled water, 0.05 parts by mass of a surfactant (NEWREX R-T, obtained from NOF CORPORATION), and 4 parts by mass of polyvinyl alcohol as a dispersant (PVA-205, obtained from KURARAY CO., LTD.) were added to a 3 L interfacial polymerization container equipped with a thermometer, followed by homogeneously mixing, to prepare an aqueous phase.

The aqueous phase was further charged with an oil phase, which had been prepared by dissolving the following materials in 100 parts by mass of ethyl acetate: i.e., 100 parts by mass of a 24% isopropanol solution of aluminum monoacetylacetonate bis(ethyl acetoacetate) (ALUMICHELATE D, obtained from Kawaken Fine Chemicals Co., Ltd.); 70 parts by mass of an adduct of methylenediphenyl-4,4'-diisocyanate (3 mol) to trimethylolpropane (1 mol) as a polyfunctional isocyanate compound (D-109, obtained from MITSUI CHEMICALS POLYURETHANES, INC.); 30 parts by mass of divinylbenzene as a radical-polymerizable compound (obtained from Merck Co., Ltd.); and 0.3 parts by mass of a radical polymerization initiator (PEROYL L, obtained from NOF CORPORATION) as an amount equivalent to 1% by mass of the radical-polymerizable compound. The resulting mixture was mixed and emulsified with a homogenizer (10,000 rpm/5 min, T-50, obtained from IKA Japan, K. K.), followed by interfacial polymerization and radical polymerization at 80° C. for six hours. After completion of reaction, the polymerization reaction liquid was left to stand to be cooled to room temperature. The polymerized particles were separated through filtration and dried at room temperature under reduced pressure for 24 hours, to obtain spherical particles having an average particle diameter of 2.9 μm.

The above particles were washed with ethyl acetate, followed by filtration under reduced pressure, to obtain a wet cake of porous particles A.

Production Example 4

Production of Porous Particles B 800 parts by mass of distilled water, 0.05 parts by mass of a surfactant (NEWREX R-T, obtained from NOF CORPORATION), and 4 parts by mass of polyvinyl alcohol as a dispersant (PVA-205, obtained from KURARAY CO., LTD.) were added to a 3 L interfacial polymerization container equipped with a thermometer, followed by homogeneously mixing, to prepare an aqueous phase.

The aqueous phase was further charged with an oil phase, which had been prepared by dissolving the following materials in 100 parts by mass of ethyl acetate: i.e., 100 parts by mass of a 24% isopropanol solution of aluminum monoacetylacetonate bis(ethyl acetoacetate) (ALUMICHELATE D, obtained from Kawaken Fine Chemicals Co., Ltd.); 70 parts by mass of an adduct of methylenediphenyl-1-4,4'-diisocyanate (3 mol) to trimethylolpropane (1 mol) as a polyfunctional isocyanate compound (D-109, obtained from MITSUI CHEMICALS POLYURETHANES, INC.); 30 parts by mass of 1,6-hexanediol diacrylate as a radical-polymerizable compound; and 0.3 parts by mass of a radical polymerization initiator (PEROYL L, obtained from NOF CORPORATION) as an amount equivalent to 1% by mass of the radical-polymerizable compound. The resulting mixture was mixed and emulsified with a homogenizer (10,000 rpm/5 min, T-50, obtained from IKA Japan, K. K.), followed by interfacial polymerization and radical polymerization at 80° C. for six hours. After completion of reaction, the polymerization reaction liquid was left to stand to be cooled to room temperature. The polymerized particles were separated through filtration and dried at room temperature under reduced pressure for 24 hours, to obtain spherical particles having an average particle diameter of 2.7 μm.

The above particles were washed with ethyl acetate, followed by filtration under reduced pressure, to obtain a wet cake of porous particles B.

Example 1-1

<Production of Porous Particles A-2 Carrying the Compound Inside Thereof>

7 g, on the solid content basis, of the wet cake of porous particles A, which had been obtained in Production Example 3, was transferred to a 100 mL three-necked flask equipped with a $N_2$ introducing tube. 5.0 g of Compound 2 and 20 g of methyl ethyl ketone were added to the flask. While $N_2$ gas was being introduced, the mixture was stirred at 70° C. for 120 minutes in an oil bath, and then the temperature of the oil bath was increased to 80° C. Under stirring, the ethyl acetate and the methyl ethyl ketone were distilled off to concentrate the liquid, to carry Compound 2 inside of porous particles A. After completion of concentration, the resulting product was cooled and left to stand at room temperature for 24 hours, followed by charging 30 g of cyclohexane and stirring for one hour. After that, a cycle of washing with 30 g of cyclohexane and filtration under reduced pressure was repeated four times. The residue after the filtration was dried under reduced pressure at 60° C. for four hours, to produce porous particles A-2 carrying Compound 2 inside thereof.

Example 1-2

<Production of Porous Particles A-3 Carrying the Compounds Inside Thereof>

7 g, on the solid content basis, of the wet cake of porous particles A, which had been obtained in Production Example 3, was transferred to a 100 mL three-necked flask equipped with a $N_2$ introducing tube. 1.5 g of Compound 1, 3.5 g of Compound 2, and 20 g of methyl ethyl ketone were added to the flask. While $N_2$ gas was being introduced, the mixture was stirred at 70° C. for 120 minutes in an oil bath, and then the temperature of the oil bath was increased to 80° C. Under stirring, the ethyl acetate and the methyl ethyl ketone were distilled off to concentrate the liquid, to produce porous particles A carrying a mixture including Compound 1 and Compound 2 inside thereof. After completion of concentration, the resulting product was cooled and left to stand at room temperature for 24 hours, followed by charging 30 g of cyclohexane and stirring for one hour. After that, a cycle of washing with 30 g of cyclohexane and filtration under reduced pressure was repeated four times. The residue after the filtration was dried under reduced pressure at 60° C. for four hours, to produce porous particles A-3 carrying the mixture including Compound 1 and Compound 2 inside thereof.

Example 1-3

<Production of Porous Particles A-4 Carrying the Compounds Inside Thereof>

7 g, on the solid content basis, of the wet cake of porous particles A, which had been obtained in Production Example 3, was transferred to a 100 mL three-necked flask equipped with a $N_2$ introducing tube. 2.5 g of Compound 1, 2.5 g of Compound 2, and 20 g of methyl ethyl ketone were added to the flask. While $N_2$ gas was being introduced, the mixture was stirred at 70° C. for 120 minutes in an oil bath, and then the temperature of the oil bath was increased to 80° C. Under stirring, the ethyl acetate and the methyl ethyl ketone were distilled off to concentrate the liquid, to produce porous particles A carrying a mixture including Compound 1 and Compound 2 inside thereof. After completion of concentration, the resulting product was cooled and left to stand at room temperature for 24 hours, followed by charging 30 g of cyclohexane and stirring for one hour. After that, a cycle of washing with 30 g of cyclohexane and filtration under reduced pressure was repeated four times. The residue after the filtration was dried under reduced pressure at 60° C. for four hours, to produce porous particles A-4 carrying the mixture including Compound 1 and Compound 2 inside thereof.

Example 1-4

<Production of Porous Particles A-5 Carrying the Compounds Inside Thereof>

7 g, on the solid content basis, of the wet cake of porous particles A, which had been obtained in Production Example 3, was transferred to a 100 mL three-necked flask equipped with a $N_2$ introducing tube. 3.5 g of Compound 1, 1.5 g of Compound 2, and 20 g of methyl ethyl ketone were added to the flask. While $N_2$ gas was being introduced, the mixture was stirred at 70° C. for 120 minutes in an oil bath, and then the temperature of the oil bath was increased to 80° C. Under stirring, the ethyl acetate and the methyl ethyl ketone were distilled off to concentrate the liquid, to produce porous particles A carrying a mixture including Compound 1 and Compound 2 inside thereof. After completion of concentration, the resulting product was cooled and left to stand at room temperature for 24 hours, followed by charging 30 g of cyclohexane and stirring for one hour. After that, a cycle of washing with 30 g of cyclohexane and filtration under reduced pressure was repeated four times. The residue after the filtration was dried under reduced pressure at 60° C. for four hours, to produce porous particles A-5 carrying the mixture including Compound 1 and Compound 2 inside thereof.

Example 1-5

<Production of Porous Particles A-6 Carrying the Compounds Inside Thereof>

7 g, on the solid content basis, of the wet cake of porous particles A, which had been obtained in Production Example 3, was transferred to a 100 mL three-necked flask equipped with a $N_2$ introducing tube. 4.5 g of Compound 1, 0.5 g of Compound 2, and 20 g of methyl ethyl ketone were added to the flask. While $N_2$ gas was being introduced, the mixture was stirred at 70° C. for 120 minutes in an oil bath, and then the temperature of the oil bath was increased to 80° C. Under stirring, the ethyl acetate and the methyl ethyl ketone were distilled off to concentrate the liquid, to produce porous particles A carrying a mixture including Compound 1 and Compound 2 inside thereof. After completion of concentration, the resulting product was cooled and left to stand at room temperature for 24 hours, followed by charging 30 g of cyclohexane and stirring for one hour. After that, a cycle of washing with 30 g of cyclohexane and filtration under reduced pressure was repeated four times. The residue after the filtration was dried under reduced pressure at 60° C. for four hours, to produce porous particles A-6 carrying the mixture including Compound 1 and Compound 2 inside thereof.

Examples 2-1 to 2-5

<Production of Porous Particles B-1 to B-5 Carrying the Compounds Inside Thereof>

Porous particles B-2 to B-6 carrying the compounds inside thereof were produced in the same manner as in Examples 1-1 to 1-5 except that porous particles A were changed to porous particles B obtained in Production Example 4.

Comparative Example 1-1

<Production of Porous Particles A-1 Carrying Compound 1 Inside Thereof>

7 g, on the solid content basis, of the wet cake of porous particles A, which had been obtained in Production Example 3, was transferred to a 100 mL three-necked flask equipped with a $N_2$ introducing tube. 5.0 g of Compound 1 and 20 g of methyl ethyl ketone were added to the flask. While $N_2$ gas was being introduced, the mixture was stirred at 70° C. for 120 minutes in an oil bath, and then the temperature of the oil bath was increased to 80° C. Under stirring, the ethyl acetate and the methyl ethyl ketone were distilled off to concentrate the liquid, to produce porous particles A carrying Compound 2 inside thereof. After completion of concentration, the resulting product was cooled and left to stand at room temperature for 24 hours, followed by charging 30 g of cyclohexane and stirring for one hour. After that, a cycle of washing with 30 g of cyclohexane and filtration under reduced pressure was repeated four times. The residue after the filtration was dried under reduced pressure at 60° C. for four hours, to produce porous particles A-1 carrying Compound 1 inside thereof.

Comparative Example 1-2

<Production of Porous Particles B-1 Carrying Compound 1 Inside Thereof>

Porous particles B-1 carrying Compound 1 inside thereof were produced in the same manner as in Comparative Example 1-1 except that porous particles A were changed to porous particles B obtained in Production Example 4.

<Analysis of the compounds carried on porous particles A-1 to A-6 and B-1 to B-6>

—Structural Evaluation Through FD-MS—

1 g of porous particles A-1 and 10 g of ethyl acetate were added to a vial. The mixture was stirred at room temperature (25° C.) for one hour, followed by filtration under reduced pressure to recover a filtrate. The filtrate recovered was evaporated and then re-dissolved in acetone. The solution was subjected to mass spectrometry through FD-MS (obtained from JEOL Ltd., JMS-600H). The mass spectrometry gave a mass spectrum with the base peak at an m/z value of 522.

—Quantification of the Compound Bound to Aluminum Through GC-MS—

0.25 g of porous particles A-1 and 10 g of tetrahydrofuran (THF) were added to a vial. The mixture was stirred at room temperature (25° C.) for one hour, followed by filtration under reduced pressure to recover a filtrate. Further, 0.1 g of pure water was added to the filtrate recovered, followed by stirring. After that, again, the filtrate was filtered under reduced pressure to recover a filtrate. The filtrate was analyzed through GC-MS (obtained from Agilent Technologies, Inc., 6890/5975MSD) and as a result the peak of ethyl salicylate only was obtained.

The results of the evaluations through the above FD-MS and GC-MS for A-1 to A-6 and B-1 to B-6 are given in Table 1 and Table 2.

TABLE 1

| Porous particles | | A-1 | A-2 | A-3 | A-4 | A-5 | A-6 |
|---|---|---|---|---|---|---|---|
| m/z value detected through FD-MS | | 522 | 522 | 522 | 522 | 522 | 522 |
| | | — | 536 | 536 | 536 | 536 | 536 |
| | | — | 550 | 550 | 550 | 550 | 550 |
| Weight ratio peak areas obtained through GC-MS converted from the | Ethyl salicylate | 100 | 87.7 | 91.5 | 94.2 | 95.7 | 99.2 |
| | Isopropyl salicylate | 0 | 12.3 | 8.5 | 5.8 | 4.3 | 0.8 |

TABLE 2

| Porous particles | | B-1 | B-2 | B-3 | B-4 | B-5 | B-6 |
|---|---|---|---|---|---|---|---|
| m/z value detected through FD-MS | | 522 | 522 | 522 | 522 | 522 | 522 |
| | | — | 536 | 536 | 536 | 536 | 536 |
| | | — | 550 | 550 | 550 | 550 | 550 |
| Weight ratio peak areas obtained through GC-MS converted from the | Ethyl salicylate | 100 | 86.9 | 91.8 | 94.3 | 96.2 | 98.7 |
| | Isopropyl salicylate | 0 | 13.1 | 8.2 | 5.7 | 3.8 | 1.3 |

Example 3-1

<Production of Porous Particles A-2-1>

1.0 g of methyltrimethoxysilane (KBM-13, obtained from Shin-Etsu Chemical Co., Ltd.) was dissolved in 9 g of cyclohexane, to prepare a surface-deactivating treatment liquid. 1.0 g of porous particles A-2 produced in Example 2-1 was charged to this treatment liquid, and the mixture was stirred at 30° C. for 20 hours. After that, while being washed with 10 g of cyclohexane, the mixture was filtered under reduced pressure to separate porous particles. The porous particles were dried under reduced pressure at 80° C. for three hours, to produce surface-treated porous particles A-2-1.

Examples 3-2 to 3-20 and Comparative Examples 2-1 and 2-2

<Production of Other Porous Particles>

In the same manner as in Example 3-1 except that the porous particles used and the silane compound used were changed as described in Table 3 to Table 7, surface-treated porous particles were produced.

TABLE 3

| Examples | 3-1 | 3-2 | 3-3 | 3-4 | 3-5 |
|---|---|---|---|---|---|
| Porous particles used | A-2 | A-3 | A-4 | A-5 | A-6 |
| Silane compound used | Methyltrimethoxysilane | | | | |
| Porous particles produced | A-2-1 | A-3-1 | A-4-1 | A-5-1 | A-6-1 |

TABLE 4

| Examples | 3-6 | 3-7 | 3-8 | 3-9 | 3-10 |
|---|---|---|---|---|---|
| Porous particles used | B-2 | B-3 | B-4 | B-5 | B-6 |
| Silane compound used | Methyltrimethoxysilane | | | | |
| Porous particles produced | B-2-1 | B-3-1 | B-4-1 | B-5-1 | B-6-1 |

TABLE 5

| Examples | 3-11 | 3-12 | 3-13 | 3-14 |
|---|---|---|---|---|
| Porous particles used | A-2 | A-4 | B-2 | B-4 |
| Silane compound used | Dimethyl(dimethoxy)silane | | | |
| Porous particles produced | A-2-2 | A-4-2 | B-2-2 | B-4-2 |

TABLE 6

| Examples | 3-15 | 3-16 | 3-17 | 3-18 | 3-19 | 3-20 |
|---|---|---|---|---|---|---|
| Porous particles used | A-2 | A-4 | B-2 | B-4 | A-3 | B-3 |
| Silane compound used | Cyclohexyl(dimethoxy)methylsilane | | | | Trimethylmethoxysilane | |
| Porous particles produced | A-2-3 | A-4-3 | B-2-3 | B-4-3 | A-3-4 | B-3-4 |

TABLE 7

| Comparative Examples | 2-1 | 2-2 |
|---|---|---|
| Porous particles used | A-1 | B-1 |
| Silane compound used | Methyltrimethoxysilane | |
| Porous particles produced | A-1-1 | B-1-1 |

Examples 4-1 to 4-20 and Comparative Examples 3-1 and 3-2

<Preparation of Cationically Curable Compositions>

70 parts by mass of YL980 (obtained from Mitsubishi Chemical Corporation, a bisphenol A-type epoxy resin), 10 parts by mass of CELLOXIDE 2021P (obtained from Daicel Chemical Industries, Ltd.), 20 parts by mass of ARONE OXETANE OXT-221 (obtained from TOAGOSEI CO., LTD.), 5 parts by mass of triphenylsilanol (obtained from KANTO CHEMICAL CO., INC.), and 2 parts by mass of the porous particles produced in each of the Examples and Comparative Examples were mixed together, to prepare cationically curable compositions.

The porous particles used in each of the Examples are described in Table 8 and Table 9 below, and the porous particles used in each of the Comparative Examples are described in Table 10.

TABLE 8

| Examples | 4-1 | 4-2 | 4-3 | 4-4 | 4-5 | 4-6 | 4-7 | 4-8 | 4-9 | 4-10 |
|---|---|---|---|---|---|---|---|---|---|---|
| Porous particles used | A-2-1 | A-3-1 | A-4-1 | A-5-1 | A-6-1 | B-2-1 | B-3-1 | B-4-1 | B-5-1 | B-6-1 |

TABLE 9

| Examples | 4-11 | 4-12 | 4-13 | 4-14 | 4-15 | 4-16 | 4-17 | 4-18 | 4-19 | 4-20 |
|---|---|---|---|---|---|---|---|---|---|---|
| Porous particles used | A-2-2 | A-4-2 | B-2-2 | B-4-2 | A-2-3 | A-4-3 | B-2-3 | B-4-3 | B-3-4 | B-3-4 |

TABLE 10

| Comparative Examples | 3-1 | 3-2 |
|---|---|---|
| Porous particles used | A-1-1 | B-1-1 |

<Evaluation of Cationic Curing Properties>

5 mg of each of the cationically curable compositions prepared in Examples 4-1 to 4-20 and Comparative Examples 3-1 and 3-2 was added to an aluminum container 5 mm in diameter for DSC6200, followed by measurement of differential scanning calorimetry, to evaluate the exothermic peak temperatures thereof.

Conditions for the differential scanning calorimetry are as follows.

[Measurement Conditions]

Device name: DSC7000X, obtained from Hitachi High-Tech Science Corporation

Heating rate: 10° C./min. (25° C. to 300° C.)

$N_2$ gas: 100 mL/min

<Evaluation of Storage Stability of Cationically Curable Compositions>

Each of the cationically curable compositions prepared in Examples 4-1 to 4-20 and Comparative Examples 3-1 and 3-2 was stored in a hermetically sealed container at 25° C. for one day (24 hours). In the same manner as described above, measurement of differential scanning calorimetry was performed before and after storage. By comparing the amounts of heat generated before and after storage, a reaction rate during the storage was estimated. The results are given in Table 11 to Table 13 in conjunction with the curing properties.

The reaction rate was determined from the following formula.

Reaction rate (%)=100×[(Amount of heat generated before storage)−(Amount of heat generated after storage)]/(Amount of heat generated before storage)

TABLE 11

| Examples | 4-1 | 4-2 | 4-3 | 4-4 | 4-5 | 4-6 | 4-7 | 4-8 | 4-9 | 4-10 |
|---|---|---|---|---|---|---|---|---|---|---|
| Porous particles used | A-2-1 | A-3-1 | A-4-1 | A-5-1 | A-6-1 | B-2-1 | B-3-1 | B-4-1 | B-5-1 | B-6-1 |
| Exothermic peak temperature [° C.] | 112.5 | 113.2 | 115.2 | 115.4 | 118.6 | 100.1 | 101.3 | 102.6 | 104.1 | 108.7 |
| Reaction rate [%] | 0.2 | 0.5 | 0.3 | 0.7 | 0.3 | 0.5 | 0.6 | 1.0 | 0.9 | 0.3 |

TABLE 12

| Examples | 4-11 | 4-12 | 4-13 | 4-14 | 4-15 | 4-16 | 4-17 | 4-18 | 4-19 | 4-20 |
|---|---|---|---|---|---|---|---|---|---|---|
| Porous particles used | A-2-2 | A-4-2 | B-2-2 | B-4-2 | A-2-3 | A-4-3 | B-2-3 | B-4-3 | B-3-4 | B-3-4 |
| Exothermic peak temperature [° C.] | 108.3 | 110.4 | 95.6 | 98.9 | 106.7 | 109.8 | 93.2 | 95.6 | 106.4 | 94.2 |
| Reaction rate [%] | 0.6 | 0.9 | 0.8 | 0.5 | 0.4 | 0.4 | 0.8 | 1.2 | 0.9 | 0.3 |

TABLE 13

| Comparative Examples | 3-1 | 3-2 |
|---|---|---|
| Porous particles used | A-1-1 | B-1-1 |
| Exothermic peak temperature [° C.] | 123.5 | 113.2 |
| Reaction rate [%] | 0.4 | 0.7 |

From the results of Table 11 to Table 13, in comparisons among the same kinds of porous particles (Comparative Example 3-1 vs. Examples 4-1 to 4-5 and Comparative Example 3-2 vs. Examples 4-5 to 4-10), the peak temperature is lowered in all of the porous particles carrying the compounds in the present invention. That is, it is found that the porous particles carrying the compounds in the present invention (cationic curing agent) are enhanced in curing properties.

Also, regarding the difference brought by the silane treatment agent (Example 4-1 vs. Example 4-11 and Example 4-15, Example 4-2 vs. Example 4-19, Example 4-3 vs. Example 4-12 and Example 4-16, Example 4-6 vs. Examples 4-13 and Example 4-15, Example 4-7 vs. Example 4-20, Example 4-8 vs. Example 4-14 and Example 4-18), it is found that use of the silane treatment agent in the present invention achieves a lowered peak temperature and enhanced curing properties.

Further, regarding the reaction rate after the storage at 25° C. for one day, there is almost no difference between the Examples and the Comparative Examples, suggesting that the porous particles in the present invention can be enhanced in curing properties without degradation in storage stability That is, it is found that the porous particles carrying the compounds in the present invention (cationic curing agent) are enhanced in curing properties without degradation in latent properties.

Examples 5-1 to 5-8

<Preparation of Cationically Curable Compositions>

70 parts by mass of YL980 (obtained from Mitsubishi Chemical Corporation, a bisphenol A-type epoxy resin), 10 parts by mass of CELLOXIDE 2021P (obtained from Daicel Chemical Industries, Ltd.), 20 parts by mass of ARONE OXETANE OXT-221 (obtained from TOAGOSEI CO., LTD.), 5 parts by mass of tris[(4-trifluoromethyl)phenyl] silanol (obtained from TOKYO CHEMICAL INDUSTRY Co., Ltd.), and 2 parts by mass of the porous particles produced in each of the Examples and Comparative Examples were mixed together, to prepare cationically curable compositions.

The porous particles used in the Examples are described in Table 14.

TABLE 14

| Examples | 5-1 | 5-2 | 5-3 | 5-4 | 5-5 | 5-6 | 5-7 | 5-8 |
|---|---|---|---|---|---|---|---|---|
| Porous particles used | A-3-1 | A-2-2 | A-2-3 | A-3-4 | B-3-1 | B-2-2 | B-2-3 | B-3-4 |

<Evaluation of Cationic Curing Properties>

5 mg of each of the cationically curable compositions prepared in Examples 5-1 to 5-8 was added to an aluminum container 5 mm in diameter for DSC6200, followed by measurement of differential scanning calorimetry in the same manner as in Examples 4-1 to 4-20 and Comparative Examples 3-1 and 3-2, to evaluate the exothermic peak temperatures thereof in the same manner as described above.

<Evaluation of Storage Stability of Cationically Curable Compositions>

Each of the cationically curable compositions prepared in Examples 5-1 to 5-8 was stored in a hermetically sealed container at 25° C. for 1 day (24 hours). In the same manner as described above, measurement of differential scanning calorimetry was performed before and after storage. By comparing the amounts of heat generated before and after storage, a reaction rate during the storage was estimated. The results are given in Table 15 in conjunction with the curing properties.

The reaction rate was determined from the following formula.

Reaction rate (%)=100×[(Amount of heat generated before storage)−(Amount of heat generated after storage)]/(Amount of heat generated before storage)

TABLE 15

| Examples | 5-1 | 5-2 | 5-3 | 5-4 | 5-5 | 5-6 | 5-7 | 5-8 |
|---|---|---|---|---|---|---|---|---|
| Porous particles used | A-3-1 | A-2-2 | A-2-3 | A-3-4 | B-3-1 | B-2-2 | B-2-3 | B-3-4 |
| Exothermic peak temperature [° C.] | 102.7 | 99.4 | 95.1 | 97.3 | 90.5 | 87.2 | 82.9 | 83.9 |
| Reaction rate [%] | 0.9 | 1.3 | 1.7 | 0.8 | 0.7 | 1.3 | 1.2 | 1.8 |

From the results of Table 15 and the above Table 11 and Table 12, in comparisons among the same kinds of porous particles (Example 4-2 vs. Example 5-1, Example 4-11 vs. Example 5-2, Example 4-15 vs. Example 5-3, Example 4-19 vs. Example 5-4, Example 4-7 vs. Example 5-5, Example 4-13 vs. Example 5-6, Example 4-17 vs. Example 5-7, and Example 4-20 vs. Example 5-8), the peak temperature is remarkably lowered in all of the cases where the compound represented by Formula (2) in the compositions is changed from triphenylsilanol to tris[(4-trifluoromethyl)phenyl]silanol. This suggests that enhanced curing properties can be obtained.

Also, regarding the reaction rate after the storage at 25° C. for one day, there is almost no difference in the above comparisons. It is found that even when the compound represented by Formula (2) in the compositions is changed from triphenylsilanol to tris[(4-trifluoromethyl)phenyl]silanol, the storage stability remains unchanged and the curing properties are effectively increased.

INDUSTRIAL APPLICABILITY

The cationic curing agent of the present invention can be suitably used as a latent curing agent of a cationically curable composition.

The cationically curable composition of the present invention can be suitably used as a cationically curable composition for latent curing.

The invention claimed is:

1. A cationic curing agent, comprising:

porous particles; and a mixture carried on the porous particles, the mixture including a first compound and a second compound, the first compound being represented by Formula (1) below:

Formula (1)

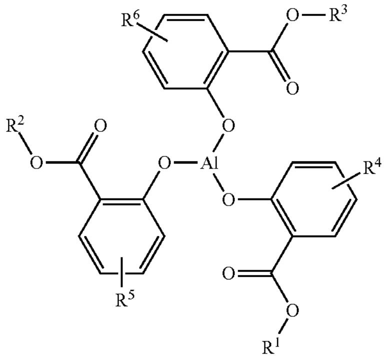

in which $R^1$ to $R^3$ are identical, and $R^4$ to $R^6$ are identical; and the second compound being represented by Formula (1) in which at least one of $R^1$ to $R^6$ is different, wherein in Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent, wherein surfaces of the porous particles include a reaction product of dimethyl(dimethoxy)silane, cyclohexyl(dimethoxy)methylsilane, or trimethylmethoxysilane.

2. The cationic curing agent according to claim 1, wherein the porous particles are formed from a material including a polyurea resin.

3. The cationic curing agent according to claim 2, wherein the material forming the porous particles further includes a vinyl resin.

4. The cationic curing agent according to claim 1, wherein the porous particles are porous inorganic particles.

5. A cationically curable composition, comprising:

a cationically curable component;

the cationic curing agent according to claim 1; and an organic silane compound.

6. The cationically curable composition according to claim 5, wherein the organic silane compound is represented by Formula (2) below:

Formula (2)

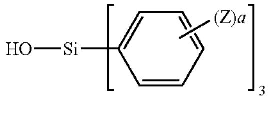

wherein in Formula (2), Z is a hydrogen atom or an electron attractive group, and a is an integer of from 0 to 5.

7. A cationic curing agent, comprising:

porous particles; and a mixture carried on the porous particles, the mixture including a first compound, a second compound, and a third compound, the first compound being represented by Formula (1) below:

Formula (1)

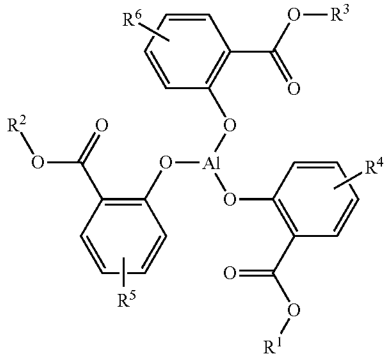

in which $R^1$ to $R^3$ are identical, and $R^4$ to $R^6$ are identical;

the second compound being represented by Formula (1) in which at least one of $R^1$ to $R^6$ is different, wherein in Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent; and the third compound being represented by Formula (2) below:

Formula (2)

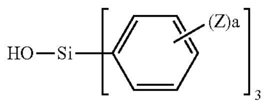

in which

Z is a hydrogen atom or an electron attractive group, and a is an integer of from 0 to 5, wherein surfaces of the porous particles include a reaction product of dimethyl(dimethoxy)silane, cyclohexyl(dimethoxy)methylsilane, or trimethylmethoxysilane.

8. The cationic curing agent according to claim 7, wherein the porous particles are formed from a material including a polyurea resin.

9. The cationic curing agent according to claim 8, wherein the material forming the porous particles further includes a vinyl resin.

10. The cationic curing agent according to claim 7, wherein the porous particles are porous inorganic particles.

11. A cationically curable composition, comprising:

a cationically curable component; and the cationic curing agent according to claim 7.

12. A method for producing a cationic curing agent, the method comprising:

dispersing a first compound, a second compound, and porous particles in an organic solvent, the first compound being a compound represented by Formula (1) below:

Formula (1)

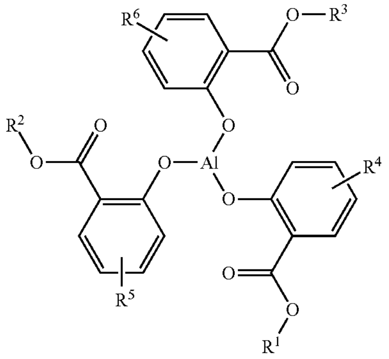

in which $R^1$ to $R^3$ are identical, and $R^4$ to $R^6$ are identical; and the second compound being represented by Formula (1) in which at least one of $R^1$ to $R^6$ is different, wherein in Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent;

removing, after the dispersing, the solvent to produce the porous particles carrying a mixture that includes the first compound represented by Formula (1) in which $R^1$ to $R^3$ are identical and $R^4$ to $R^6$ are identical and the second compound represented by Formula (1) in which at least one of $R^1$ to $R^6$ is different; and forming a reaction product of dimethyl(dimethoxy)silane, cyclohexyl(dimethoxy)methylsilane, or trimethylmethoxysilane on surfaces of the porous particles.

13. A method for producing a cationic curing agent, the method comprising:

dispersing a first compound, a second compound, a third compound, and porous particles in an organic solvent, the first compound being represented by Formula (1) below:

Formula (1)

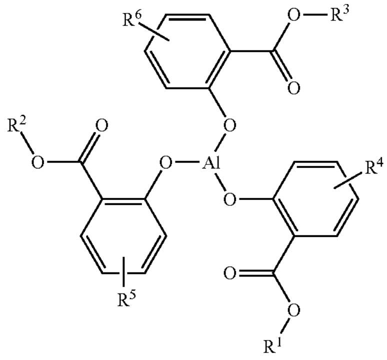

in which $R^1$ to $R^3$ are identical, and $R^4$ to $R^6$ are identical;

the second compound being represented by Formula (1) in which at least one of $R^1$ to $R^6$ is different, wherein in Formula (1), $R^1$ to $R^3$ are each an optionally branched alkyl group having from 1 to 18 carbon atoms, or a phenyl group that may have a substituent, and $R^4$ to $R^6$ are each a hydrogen atom, an optionally branched alkyl group having from 1 to 4 carbon atoms, a halogenoalkyl group, an alkoxy group, or a phenoxy group that may have a substituent; and the third compound being represented by Formula (2) below:

Formula (2)

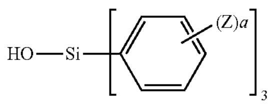

in which

Z is a hydrogen atom or an electron attractive group, and a is an integer of from 0 to 5;

removing, after the dispersing, the solvent to produce the porous particles carrying a mixture that includes the first compound represented by Formula (1) in which $R^1$ to $R^3$ are identical and $R^4$ to $R^6$ are identical, the second compound represented by Formula (1) in which at least one of $R^1$ to $R^6$ is different, and the third compound represented by Formula (2); and forming a reaction product of dimethyl(dimethoxy)silane, cyclohexyl(dimethoxy)methylsilane, or trimethylmethoxysilane on surfaces of the porous particles.

* * * * *